Sept. 2, 1952
H. B. BERGESON
2,609,471
WELDING ROD HOLDER
Filed March 2, 1950
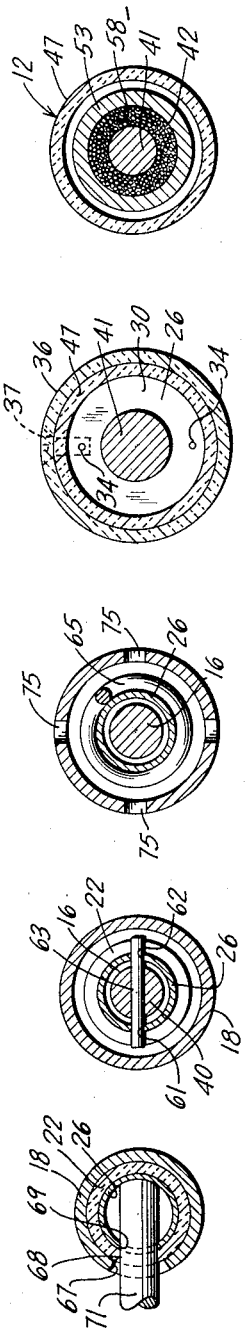
INVENTOR.
HAROLD B. BERGESON
BY Wallace and Cannon
ATTORNEYS Patented Sept. 2, 1952

2,609,471

UNITED STATES PATENT OFFICE 2,609,471

WELDING ROD HOLDER

Harold B. Bergeson, Wilmington, Ill.

Application March 2, 1950, Serial No. 147,266

6 Claims. (Cl. 219—8)

This invention relates to electrode holders and more particularly to electrode holders of the type particularly well adapted for holding welding rod electrodes during electric welding operations.

Electrode holders of various types have been heretofore known in the art. However, previously known holders have had several inherent disadvantages such as, for example, being heavy in weight; being complicated in construction and difficult and expensive to manufacture; being unreliable in operation; having exposed portions which were electrically energized; being difficult to open and close for the purpose of removing and replacing electrodes; or being so constructed that the electrodes were engaged by portions of the holder in a twisting motion so as to subject the thus engaged portions of the holder to excessive wear. It is a primary object of my invention to provide a novel electrode holder which overcomes such disadvantages.

Another object is to so construct an electrode holder of the type wherein electric current is passed therethrough to an electrode held thereby, that the external parts thereof are electrically insulated from the electrode and the conductors feeding current to the electrode.

A further object of my invention is to provide a novel electrode holder embodying clamping jaws for holding such an electrode in a novel manner, and wherein the jaws may be opened and closed in a novel and expeditious manner for the purpose of removing and replacing electrodes.

An object ancillary to the foregoing is to provide an electrode holder of the aforementioned type wherein the clamping jaws thereof may be quickly and easily opened and closed for the purpose of replacing electrodes therein by a simple turning or twisting movement of external portions of the holder relative to each other, and wherein, upon such movement of the aforementioned portions of the holder, the clamping jaws are automatically held in adjusted opened or closed position to which they have been moved thereby.

Another object of my invention is to so construct an electrode holder of the aforementioned type that engagement between the electrode and the clamping jaws is effected by straight line, non-rotating reciprocation of the clamping jaws relative to the electrode.

Yet another object of my invention is to provide an electrode holder of the aforementioned type wherein the end portion of the electrode holder from which the electrode projects is effectively shielded against welding spatter by a shield member which is repellant to welding spatter and which is constructed of material which is not subject to being burned by such spatter.

A further object is to so constitute and arrange the internal parts of a welding rod holder of the aforementioned type that spatter which may enter the holder will not jam or seriously interfere with the movement of the aforementioned internal parts of the holder.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a side elevational view of a welding rod holder embodying the principles of my invention;

Fig. 2 is a longitudinal sectional view of the device shown in Fig. 1;

Figs. 3, 4, 5, 6 and 7 are detail sectional views taken substantially along correspondingly numbered lines in Fig. 2.

For the purpose of illustrating my invention, an electrode holder 10, embodying the principles thereof, is shown in the accompanying drawings. The holder 10 comprises, in general, a handle 12, a housing 14, and a screw 16, Fig. 2, constituted and arranged in a manner wherein the handle 12 and the housing 14 are disposed substantially in axial alignment with each other, and the screw 16 is disposed in the handle 12 and the housing 14 in a manner whereby the housing 14 and the screw 16 afford novel clamping means for holding a welding rod or electrode, and the handle 12 and the housing 14 are effective in a novel and expeditious manner to control the clamping relation of the screw 16 and the housing 14 relative to such welding electrode.

More specifically, the housing 14 comprises a substantially tubular shaped shield 18 made of suitable material, such as, aluminum, and having a closed end 19 and an open end 20. A substantially tubular shaped insulator member 22, made of suitable material such as pressed paper fiber, or the like, and having a closed end 23 and an open end 24, is mounted in the shield 18 with the closed end 23 thereof disposed in abutting relation with the closed end 19 of the shield 18, and the side walls of the insulator member 22 disposed in relatively closely fitting relation to the adjacent side walls of the shield 18. Within the insulator member 22, a substantially tubular shaped sleeve 26, made of suitable metallic electrically conductive material, such as brass, is disposed, the sleeve 26 having a closed end 27 and an open end 28 and being mounted in the insulator member in a manner whereby the closed end 27 is disposed in abutting relation with the closed end 23 of the insulator member 22, and the side walls of the one end portion of the sleeve 26 are disposed in relatively close fitting engagement with the corresponding side wall portions of the insulator member 22.

As is best seen in Fig. 2 the free end portions 20 and 28 of the shield 18 and the sleeve 26, respectively, project a considerable distance outwardly beyond the free end portion 24 of the insulator member 22. An outwardly flaring flange 30 is afforded on the outer end portion 28 of the sleeve 26, and a collar or ring 32 made of suitable insulating material, such as, for example, pressed paper fiber, is mounted on the free end portion 28 of the sleeve 26 in engagement with the inner face of the flange 30, and is held in such position by suitable means, such as, pins 34 extending through the flange 30 into the ring 32. The free end portions 20 and 28 of the shield 18 and the sleeve 26, respectively, are disposed in spaced relation to each other, Fig. 2, the insulation ring 32 being effective to retain the aforementioned free end portions of the shield 18 and the sleeve 26 in such spaced position to thereby maintain the sleeve 26 in insulated relation to the shield 18.

A collar 36 made of suitable insulating material, such as, for example, pressed paper fiber, or the like, is mounted on the free end portion 20 of the shield 18, in overlapping relation thereto and projects longitudinally outwardly therefrom. The collar 36 is releasably held in such overlapping position on the shield 18 by a screw 37 extending through the collar 36 into the inner insulation sleeve 32. Thus, it will be seen, that the housing 14 includes the shield 18, the insulation member 22, the sleeve 26, the inner collar 32, and the outer collar 36, assembled in normally fixed relation to each other, but which, by removing the screw 27, may be disassembled if desired.

The screw 16 comprises a substantially straight elongated member made of suitable metallic, electrically conductive material, such as, for example, brass, and having a head 39 on one end thereof connected by a reduced shank portion 40, and an enlarged shank portion 41, to a tapered portion 42 at the other end thereof. As is best seen in Fig. 2 the enlarged shank portion 41 embodies screw threads 44 on the outer peripheral surface thereof.

The handle 12 comprises a nut 46 made of suitable material, such as, for example, brass, which is mounted on the enlarged shank portion 41 and is threadedly engaged with the threads 44, and an elongated tubular member 47 having one end portion mounted on the nut 46 and held thereon by suitable means, such as, a screw 48. The internal diameter of the tubular member 47 is preferably substantially of the same size as the external diameter of the nut 46 so that it is disposed over the nut 46 in relatively close fitting engagement therewith. The other end portion of the tubular member 47 projects outwardly from the nut 46 in a direction away from the housing 14 and affords a free end portion 49 of the tubular member 47 which is disposed outwardly beyond the tapered end 42 of the screw 16 to thereby afford a conduit through which suitable conductor means such as, a cable 51 may be inserted into the holder 10 and connected to the screw 16 as will be discussed in greater detail hereinafter.

For the purpose of connecting a suitable conductor, such as the cable 51 to the screw 42, I provide a nut 53 having threads 54 formed in one end thereof, and having a stepped outwardly flaring bore 55 in the other end thereof, the bore 55 having an inwardly projecting shoulder 56. To connect the cable 51 to the screw 16, the insulation material on the end of the cable 51 may be stripped to expose the wires 58, Fig. 2, and with the nut 53 disposed in position wherein the outwardly flaring bore 55 projects longitudinally from the threads 44 a substantial distance, the wires 58 may be pressed into the enlarged bore 55 of the nut 53 in a manner whereby the end 42 affords in effect, a central bore therefor, and the nut 53 may then be screwed onto the screw 16 to thereby wedge the shoulder 56 on the nut 53 into clamping engagement with the wires 58 and thereby hold them firmly against the end 42 of the screw 16. This may be accomplished with the screw 48 removed from the tubular member 47 so that the tubular member 47 may be disposed over the body portion of the cable 51 and ready access afforded to the nut 53.

Two aligned elongated slots 61 and 62 are formed in opposite sides of the sleeve 26, Figs. 2 and 6, and extend substantially longitudinally thereof. A pin 63 is mounted in the reduced shank 40 of the screw 16 and extends outwardly on both sides thereof through the slots 61 and 62 to afford an abutment for one end of a helical compression spring 65 mounted on and extending around the sleeve 26. The other end of the spring 65 is disposed in abutting relation to the adjacent face of the inner insulating ring 32. Thus, it will be seen that the spring 65, compressed between the pin 63 and the inner ring 32, tends, in effect, to press the end of the screw 16, bearing the head 39, into the housing 14. Such movement, it will be seen, is resisted by the handle 12 which, through the nut 46 is threadedly engaged with the enlarged shank portion 41 of the screw 16, the face 46a of the nut 46 normally being engaged with the flange 30 of the sleeve 26, inwardly of the shield 18 to thereby hold the screw 16 against the urging of the spring 65.

However, it will be seen that upon rotation of the handle 12 in one direction, the nut 46 is fed outwardly on the screw 16, away from the flange 30 on the sleeve 26, and the screw 16 is freed for inward movement by the spring 65 into the housing 14; and, upon rotation of the handle 12 in the other direction, the nut 46, through its engagement with the screw 16 and the flange 30 on the sleeve 26, is effective to force the housing 14 and the screw 16 apart to thereby move the head 39 of the screw outwardly away from the closed end of the housing 14. Such movement of the screw 16 into and out of the housing 14, it will be seen is in a straight line direction with no relative rotation between the housing 14 and the screw 16.

As is best seen in Figs. 1 and 7, aligned openings 67, 68 and 69 are formed in one side wall of the shield 18, the insulation member 22 and the sleeve 26, respectively, preferably in such position longitudinally of the housing 14 that the closed end 27 of the sleeve 26 forms a chord for the peripheral arc at one side of the openings and the opposite side of the openings project therefrom toward the handle 12. The openings 68 and 69 in the insulation member 22 and the sleeve 26, respectively, are preferably of substantially the same size and are considerably smaller in the cross-section than the opening 67 in the shield 18. The openings 67 and 68 are large enough to permit a welding rod or electrode 71 to be inserted therethrough, and, thus, it will be seen that one end of the electrode 71 may be inserted through the openings 67—69 into the housing 14, and the end thereof disposed in abutting relation to the inner face of the sleeve 26 opposite the opening 69. It will be seen that, with the electrode 71 disposed in this position in the housing 14, the insulation member 22 and the sleeve 26, is effective to retain the rod 71 in spaced relation to the shield 18 to thereby electrically insulate the shield 18 from the rod 71.

As is best seen in Fig. 2 the housing 14 and the screw 16 afford clamping jaws for holding such an electrode in operative position in the openings 67—69, the closed end 27 of the sleeve 26, and the adjacent edge portions of the openings 68 and 69 in the insulation member 22 and the sleeve 26, respectively, affording one clamping jaw and the end face 39a of the head 39 affording the other clamping jaw. Thus, it will be seen that with the screw 16 disposed in outwardly retracted position so as to dispose the head 39 thereof out of alignment with the openings 67—69, a welding rod 71 may be mounted in such operative position in the openings 67—69 and the handle 18 may then be rotated relative to the body member 14 in proper direction to advance the nut 46 on the screw 16 away from the head 39 to thereby permit the screw 16 to be advanced by the spring 65 toward the closed end 19 of the shield 18 into engagement with the adjacent side of the electrode 71 and thereby press the opposite side of the electrode against the closed end 27 of the sleeve 26 and against adjacent edges of the openings 68 and 69 in the insulation member 22 and the sleeve 26.

The size of the openings 68 and 69, is preferably controlled by the largest size of welding rod that it is desired to use in the holder 10. Thus, for example, in a welding rod holder 10 of the size adapted to carry approximately 250 amperes at 40 volts, the maximum size of the openings 68 and 69 should be just in excess of a quarter of an inch so that a welding rod or electrode having a maximum diameter of one-quarter inch may be inserted therethrough. On the other hand, if an electrode handle 10 of a larger capacity is to be afforded, such as, for example, a holder which would carry a maximum of 500 amperes at 40 volts, the size of the openings 68 and 69 would be correspondingly enlarged to accommodate a correspondingly larger welding rod or electrode, in this instance, a welding rod or electrode of approximately three-eighths inch diameter. In controlling the size of the openings 68 and 69 in this manner, it will be seen that an effective control is afforded for preventing a welding rod of too great a diameter be mounted in the holder 10, and, furthermore, it will be seen that the arc of the peripheral edges of the openings 68 and 69 is controlled to give good effective contact with the peripheral surface of the electrode 71. Of course, if desired, openings 68 and 69 may be utilized which are considerably larger than the electrodes to be mounted therein, but in the construction of my device, I prefer that the size of the openings be controlled in the aforementioned manner.

The shoulder 41a between the reduced shank 40 and the enlarged shank 41 of the screw 16 is preferably disposed such a distance from the face 39a of the head 39 that when the screw 16 is disposed in the most inwardly disposed relation relative to the housing 14, that is, with the face 39a of the head 39 engaged with the adjacent face of the closed end 27 of the sleeve 26, the shoulder 41a is engaged with the adjacent face of the flange 30 on the sleeve 26. When the screw 16 is so disposed in the housing 14, the face 46a of the nut 46, will, of course, be disposed on the other side of the shoulder 41a of the enlarged shank 41 and will be disposed out of holding engagement with the flange 30. Subsequent movement of the handle 12 toward the housing 14 by rotation of the handle 12 on the screw 16, as previously discussed, is effective to advance the leading face 46a of the nut 46 past the shoulder 41a into operative engagement with the flange 30 and thereby force the housing 14 and the screw 16 away from each other and thereby open the clamping jaws.

In the preferred embodiment of my invention, the screw 16 and the housing 14 are constituted and arranged in the manner shown herein, whereby the head 39 normally closes the openings 68 and 69 sufficiently that during a welding operation, it is difficult for welding spatter to enter the housing 14 through the openings 68 and 69. However, my novel holder 10 is so constructed that in the event that such spatter does enter the openings 68 and 69 and adhere to the head 39 or the adjacent surface of the sleeve 26, good protection is afforded against such spatter effectively jamming the holder 10. Thus, it will be seen that, during the next movement of the screw 16 along the sleeve 26, the adhering welding spatter will normally be scraped off between the heads 39 and the peripheral edges of the openings 68 and 69 and be discharged outwardly through the openings 67—69. However, if the spatter is scraped into position between the screw 16 and the sleeve 26, it will fall into the space between the reduced shank 40 and the sleeve 26 which provides clearance therefor.

In the operation of my novel electrode holder 10, the tubular member 47 may be turned so as to unscrew the nut 46 toward the tapered end 42 of the screw 16 to such position that the screw 48 is moved out from under the outer sleeve 36. The screw 48 may then be removed from the tubular member 47, and the tubular member 47 may be slid onto the free end of a suitable conductor such as the cable 51. The wires 58 of the cable 51 may then be engaged with the tapered end of the screw 16 and secured thereto by proper rotation of the nut 53 as previously mentioned. Thereafter, the tubular member 47 of the handle 12 may be again disposed on the nut 46 and the screw 48 be inserted therethrough to thereby hold the tubular member in operative position on the nut 46.

At this time, it will be seen that the screw 46 is disposed out of engagement with the flange 30 so that, therefore, the flange 30 is disposed in engagement with the shoulder 41a on the screw 16 and the screw 16 is disposed in most inwardly disposed position in the housing 14 with the face 39a of the head 39, abutting the closed end 27 of the sleeve 26.

When it is desired to move the screw 16 outwardly away from the closed end 27 of the sleeve 26, the nut 46 may be rotated in the proper direction by rotating the tubular member 47, to thereby move the face 46a of the nut 46 into engagement with the flange 30 and, upon continued rotation of the nut 46 in the aforementioned direction, the nut 46 presses against the flange 30 and is effective to move the screw 16 and the housing 14 outwardly away from each other against the urging of the spring 65. After the screw 16 has been moved outwardly from the housing 14 sufficiently to permit a welding rod 71 to be inserted through the openings 67—69, the end portion of the rod 71 may be so inserted in the openings 67—69, and the handle 12 may be rotated in the other direction to thereby permit the screw 16 to move inwardly relative to the housing 14 and clamp the welding rod 71 between the face 39a of the head 39 and the adjacent face of the closed end 27 of the sleeve 26. The spring 65 is preferably relatively strong so that the welding rod 71 is held firmly between the head 39 and the closed end 27.

With the welding electrode 71 so clamped in the electrode holder 10, electric current may be fed from the cable 51 through the screw 16 and the metallic sleeve 26 in engagement therewith, into the electrode 71 to thereby energize the electrode 71 for welding purposes. During a welding operation, the holder 10 is preferably held by the operator by the handle 12 or by grasping a combination of a portion of the handle 12 and the outer collar 36. As previously mentioned, the handle 12 and the outer collar 36 are efficiently insulated from the electrical conductors of the electrode holder 10, which conductors include the screw 16 and the brass sleeve 26, and thereby afford an efficient handle by which the operator may grasp the electrode holder during such a welding operation.

As previously mentioned, it will be seen that the shield 18 is also electrically insulated from the conductors 16 and 26 of the electrode holder 10 and from the electrode 71. However, as previously mentioned, the shield 18 is preferably made of aluminum, so as to repel welding spatter which may strike thereagainst, and, being made of metal affords a relatively good conductor for the intense heat produced by the welding operation so that the outer sleeve 36 and the tubular member 47 of the handle 12, which are constructed of material which are both good electric insulators and heat insulators, afford the better portion by which to hold the electrode holder 10 during a welding operation.

To afford cooling of the shield 18, and the handle 12, and to further reduce the weight of the electrode holder 10, suitable openings 75 and 76 may be afforded in the side walls of the shield 18 and the tubular member 47, respectively, whereby air may be circulated through these portions of the electrode holder 10.

When it is desired to replace an electrode 71, it will be seen that the operator may grasp the housing 14 in one hand and the handle 12 in the other hand, and by twisting the two members a short distance relative to each other, release the used electrode 71 from clamping engagement between the closed end 27 of the sleeve 26 and the head 39 of the screw 16. The nut 46 is effective to hold the sleeve 26 in such position relative to the head 39 of the screw 16 and, therefore, it will be seen that a new electrode may readily be inserted through the openings 67—69 into operative position in the holder 10, and the housing 14 and the handle 12 may then be readily turned in the opposite direction to again release the screw 16 for urging by the spring 65 back into clamping engagement with the new electrode 71.

From the foregoing, it will be seen that I have afforded a novel electrode holder wherein the clamping members are moved in straight line relation to each other without twisting or sliding engagement with the electrode held therebetween.

Also, it will be seen that I have afforded a novel electrode holder of the aforementioned type wherein the engagement and disengagement of the clamping members with the electrode may be quickly and easily effected in a novel and expeditious manner, by merely turning the housing and the handle relative to each other, turning of these portions relative to each other being effective to adjust the clamping jaws and to hold the clamping jaws in such adjusted position.

Also, it will be seen that I have afforded an electrode holder wherein the end thereof, which is disposed adjacent to the arc during a welding operation, is efficiently protected against accumulating spatter thereon or being burned by the arc produced during the operation.

In addition, it will be seen that I have afforded a novel electrode holder of the aforementioned type wherein the holder is efficiently protected against the entry of welding spatter into the internal portion thereof, but wherein, if welding spatter does enter the internal portion of the holder, the parts are so constituted and arranged that the spatter will be scraped off from the relatively moving internal parts and will fall into a free space therebetween from which the spatter may be removed a the operator's convenience.

Thus, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A welding electrode holder comprising a substantially tubular-shaped shield member having one closed end and having an opening extending through the side wall of such one end portion, and means for clamping such an electrode in operative position in said opening with said electrode disposed in electrically insulated relation to said shield, said means comprising a substantially tubular-shaped insulation member mounted in said one end portion of said shield and having an opening formed in a side wall thereof in registration with said first mentioned opening, for the reception of such electrode disposed in said first mentioned opening, one edge portion of said opening in said insulation member being disposed diametrically inwardly of the corresponding edge portion of said first mentioned opening, an elongated screw slidably and non-rotatably mounted in said insulation member and having an end adapted to engage said electrode to thereby operatively clamp said electrode against the portion of said insulation member defining said one edge portion of said opening in said insulation member, and means for moving said shield and said insulation member longitudinally of said screw to thereby move said screw and said one edge portion of said opening in said insulation member into and out of clamping position relative to said electrode disposed in said last mentioned opening, said last named means comprising advancing means mounted on and threadedly engaged with said screw for movement longitudinally of said screw upon rotation relative thereto, said advancing means being disposed on said screw in position to press said shield and said insulation member longitudinally outwardly on said screw when said advancing means is moved in one direction longitudinally of said screw, and spring means operatively connected between said shield and said screw for urging said shield member and said insulation member inwardly longitudinally of said screw upon movement of said advancing means in the other direction longitudinally of said screw.

2. A welding electrode holder comprising a housing including an elongated shield member having an opening in one side thereof for the insertion of such an electrode in operative position therein, and an insulation member carried by said shield member and engageable with such an electrode disposed in said position for holding said electrode in spaced relation to said shield member, an elongated screw mounted in said housing, said housing and said screw being movable in two directions relative to each other for moving said insulation member and said screw into and out of clamping engagement with such electrode, and means for moving said screw and said housing in said two directions relative to each other, said means comprising a spring mounted between and connected to said screw and said housing and yieldably urging said screw and said housing in one of said directions, and means for moving said screw and said housing in the other of said directions in opposition to the urging of said spring, said last named means comprising a sleeve member rotatably mounted on said screw in abutting relation to said housing, said sleeve member including means operatively connected to said screw for moving said sleeve member in one direction relative to said screw upon rotation of said sleeve member in one direction relative to said screw, said sleeve member being operable when moved in said last mentioned direction longitudinally of said screw to push said housing and said screw in said other of said two directions relative to each other.

3. A welding electrode holder comprising an elongated substantially tubular-shaped housing, said housing having an opening in one side thereof for receiving an end portion of such an electrode in operative position therein, means comprising an elongated screw member non-rotatably mounted in said housing for feeding electric current to an electrode disposed in said position, said housing and said screw being slidable in two directions longitudinally of each other into and out of clamping engagement with such an electrode disposed in said position, and means for sliding said housing and said screw in said two directions relative to each other, said last named means comprising a compression spring operatively connected between said housing and said screw and yieldably urging said housing and said screw in one of said directions, and sleeve means rotatably mounted on, and threadedly engaged with, said screw in abutting relation to said housing, said sleeve means being movable longitudinally of said screw in a direction toward said housing upon rotation of said sleeve means in one direction to thereby press said housing and said screw in said other of said two directions.

4. A welding electrode holder comprising an elongated screw member having a head on one end portion thereof, screw threads on the other end portion thereof, and a shank of reduced cross-section interconnecting said head and said other end portion, an elongated housing mounted on said one end portion of said screw, said housing comprising an outer aluminum sleeve member, an inner metal sleeve axially aligned with said aluminum sleeve member, and an intermediate sleeve member of insulation material disposed between said inner and outer sleeve members and holding said inner and outer sleeve members in spaced relation to each other, said sleeve members having aligned openings therein for the reception of one end portion of such an electrode in operative position therein, said housing and said screw being reciprocable longitudinally of each other for moving said intermediate sleeve member and said head into and out of clamping engagement with such an electrode disposed in said operative position, and means for reciprocating said housing and said screw longitudinally of each other, said means comprising a spring mounted on said inner sleeve member and operatively connected between said screw and said housing for urging said screw and said housing in one direction longitudinally of each other, and a substantially tubular shaped handle, having an outer layer of insulation material, engaged with said housing and operatively engaged with said screw threads for moving said housing and said screw in the other of said directions relative to each other upon rotation of said handle in one direction on said screw.

5. A welding electrode holder comprising an elongated housing comprising an elongated aluminum sleeve, an elongated inner metal sleeve member mounted in said aluminum sleeve in axial alignment therewith, and means holding said sleeve members in spaced nested relation to each other, said means comprising a sleeve of insulation material mounted on one end of said inner sleeve between inner sleeve and said aluminum sleeve, and a collar on the other end of said inner sleeve and comprising a ring of insulation material mounted on said other end of said inner sleeve and said aluminum sleeve, said three sleeves having aligned openings in one side thereof for the reception of such an electrode, said openings in said inner sleeve and said sleeve of insulation material being smaller in cross-section than said opening in said aluminum sleeve whereby such an electrode disposed in said openings is held in spaced relation to said aluminum sleeve, and means for clamping such an electrode disposed in said openings against said inner sleeve, said means comprising an elongated screw slidably mounted in said inner sleeve in axial alignment therewith and movable longitudinally thereof into and out of said clamping relation to such an electrode, a coil spring mounted on said inner sleeve and operatively connected to said screw and said collar for yielding urging said screw and said inner sleeve toward each other, and sleeve means mounted on said screw in abutting relation to said collar, said sleeve means being threadedly engaged with said screw for movement therealong toward said inner sleeve upon rotation on said screw in one direction for thereby forcing said inner sleeve and said screw outwardly relative to each other against the urging of said spring upon rotation of said sleeve means in said one direction on said screw.

6. A welding electrode holder comprising an elongated metal screw member, means for clamping such an electrode against one end of said screw, and means for connecting the other end of said screw to a source of electrical energy for electrically energizing such an electrode so clamped against said one end of said screw, said first named means comprising a tubular-shaped aluminum shield member having a closed end and an open end and having an opening extending through one side wall thereof in said closed end portion, a tubular-shaped insulation member having a closed end and an open end, said insulation member being mounted in said shield member with said closed ends disposed in abutting relation to each other, a tubular-shaped metal member having a closed end and an open end, said metal member being mounted in said insulation member with said closed end of said metal member and said closed end of said insulation member disposed in abutting relation to each other, means connecting said open ends of said shield member and said metal member in fixed insulated relation to each other to thereby clamp said insulation member in fixed position between said shield member and said metal member, said metal member and said insulation member each having an opening disposed in registration with said opening in said shield member whereby an end portion of such an electrode may be disposed in operative position in said openings, said openings in said metal member and said insulation member being of smaller cross-section than said opening in said shield member whereby the peripheral edge portions of said openings in said metal member and said insulation member are disposed radially inwardly of the peripheral edge portions of said opening in said shield member, said metal member having an elongated longitudinally extending slot therein, a pin mounted in said screw and extending through said slot, a handle member comprising a tubular member of insulation material mounted on and encircling said other end portion of said screw adjacent to said open end of said shield, and a nut fixedly mounted in said tubular member and threadedly engaged with said screw for moving said handle member longitudinally of said screw, said handle member engaging said means connecting said open ends of said shield member and said metal member and operable to push said shield member, said insulation member, and said metal member longitudinally outwardly on said screw when said handle member is moved in one direction longitudinally of said screw, and a compression spring mounted between said pin and said last named means and urging said shield member, said insulation member, and said metal member longitudinally inwardly on said screw.

HAROLD B. BERGESON.

REFERENCES CITED

The following references are of record in the file of this patent:

UNITED STATES PATENTS

| Number | Name | Date |
| --- | --- | --- |
| 1,293,538 | Pierce | Feb. 4, 1919 |
| 2,233,618 | Leach | Mar. 4, 1941 |
| 2,372,009 | Raymond | Mar. 20, 1945 |
| 2,387,464 | Palingrew | Oct. 23, 1945 |
| 2,401,383 | Wilson | June 4, 1946 |